Patented Mar. 5, 1935

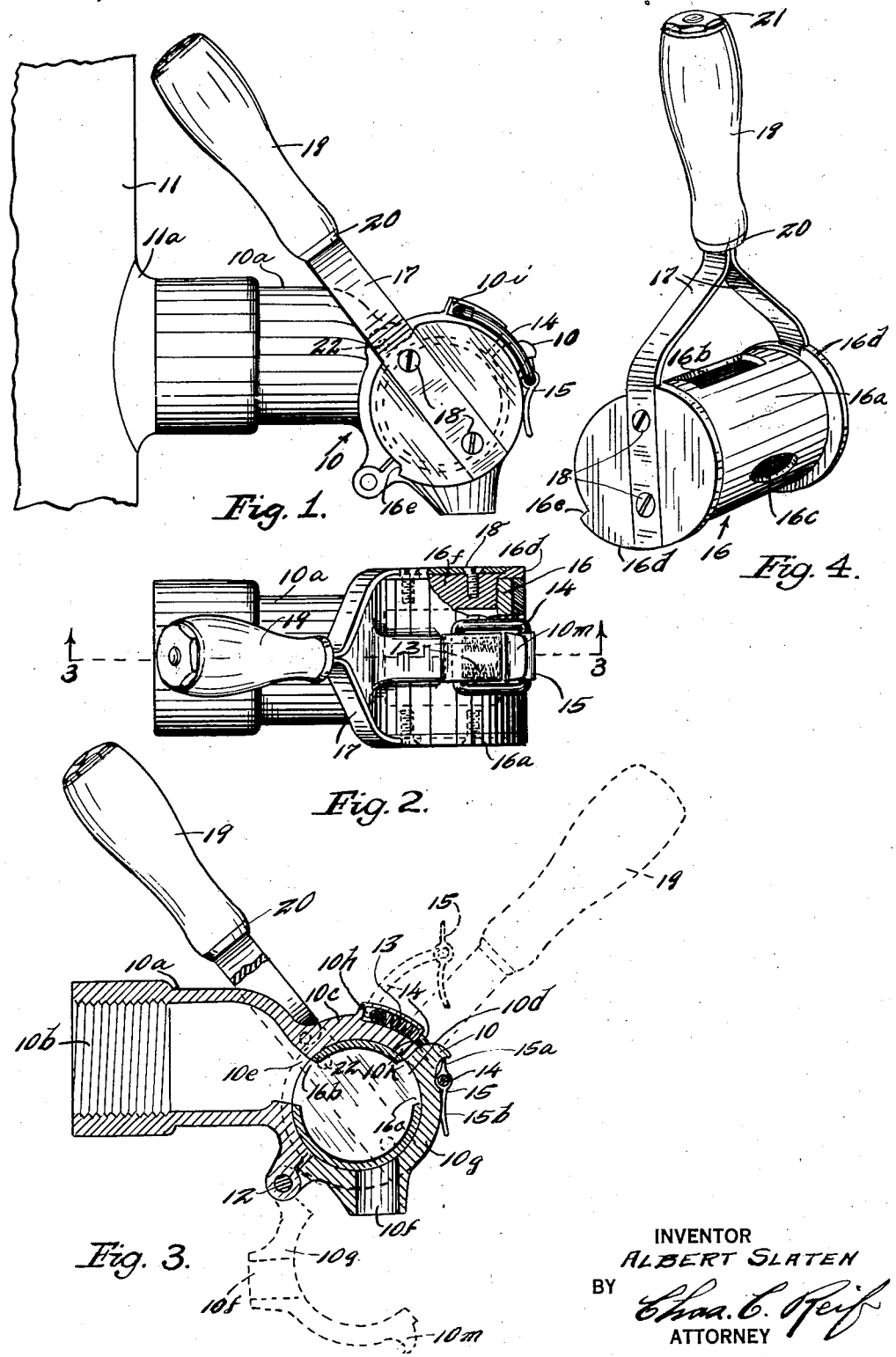

1,993,021

UNITED STATES PATENT OFFICE 1,993,021

CREAM DISPENSING VALVE

Albert Slaten, Minneapolis, Minn.

Application September 2, 1933, Serial No. 687,945

11 Claims. (Cl. 221—106)

This invention relates to a valve, particularly a measuring valve and while the invention has many applications, it has great utility in restaurants, hotels and like places for dispensing cream or milk.

Measuring valves are now commonly used in restaurants and like places for dispensing a certain amount of cream from a container into cups in which coffee is served. It is desirable to have a measuring valve of such structure that it is easily operated, can be easily cleaned and is maintained in proper working condition with little attention.

It is an object of this invention, therefore, to provide a measuring valve comprising a casing having a cylindrical chamber therein with receiving and discharge ports communicating with said chamber, a shell-like member received in said casing and oscillatatable in said chamber also having inlet and outlet ports adapted to register respectively with said receiving and discharge ports, said casing comprising a movable part which partially embraces said shell and is spaced from the stationary part of said casing so that provision is had for moving said movable part to properly engage said shell whereby wear between said parts may be taken up.

It is a further object of the invention to provide such a valve as set forth in the preceding paragraph in which said movable part of said casing is held in position snugly embracing said shell by resilient means.

It is still another object of the invention to provide a valve structure as set forth above having said casing and shell, said casing having a fixed part and a swingable part, said swingable part being separated from said stationary part along a plane extending substantially diametrically through the chamber in said casing and being spaced slightly from said stationary part at its free end when in position engaging said shell together with means holding said swingable part in position snugly engaging said shell so that wear on said casing and shell may be taken up and said shell may be removed from said casing when said swingable part is moved to open position.

It is also an object of the invention to provide a valve structure as set forth in the preceding paragraph in which said swingable part is held in position engaging said shell by resilient means acting to hold said swingable part in snug engagement with said shell.

It is more specifically an object of the invention to provide a measuring valve structure comprising a casing having a cylindrical chamber therein and receiving and discharge ports communicating with said chamber, a shell oscillatable in said cylindrical chamber and having inlet and outlet ports adapted to aline respectively with said receiving and discharge ports, said casing being divided along a plane extending substantially diametrically of said chamber and thus having a fixed part and a movable part hinged thereto, said fixed part having a member pivoted thereto at the side opposite the connection to said movable part, a lever pivoted to said swingable member and a spring acting on said swingable member, said movable part having means adapted to be engaged by said lever whereby said movable part may be moved to position engaging said shell and said means engaged by said lever and said lever swung past a dead center position to hold said movable part in snug engagement with said shell under tension of said resilient means, the free end of said movable part being spaced from said stationary part of said casing whereby wear between said casing and shell will be taken up by said resilient means.

These and other objects and advantages of the invention will be fully set forth in the following description made in connection with the accompanying drawing, in which like reference characters refer to similar parts throughout the several views and in which:—

Fig. 1 is a view in side elevation of said valve;

Fig. 2 is a top plan view, some parts being broken away and others shown in horizontal section;

Fig. 3 is a vertical section taken on line 3—3 of Fig. 1 as indicated by the arrows, some parts being broken away and parts indicated in different positions by dotted lines; and Fig. 4 is a perspective view of the shell member used.

Referring to the drawing, a valve is shown comprising a casing 10 which has a sleeve 10a of cylindrical form having an internally threaded end portion 10b adapted to be attached to the threaded discharge spout 11a of a liquid container 11 which may contain cream or other liquid to be measured and dispensed. Sleeve 10a has formed thereon a portion 10c of said casing, which portion is bored to have therein a cylindrical chamber 10d. Casing 10 has a receiving port 10e communicating with the interior of the sleeve 10a and a discharge port 10f, both of which ports communicate with the bore or chamber 10d. The casing 10, and specifically the portion 10c, is divided along a plane extending substantially diametrically of chamber 10d and at an angle of substantially 45° with the vertical so that said casing has a movable portion 10g which is hinged to the remainder or stationary part of said casing by a hinged pintle 12 so that part 10g is swingable away from the stationary part of said casing as indicated by the dotted lines in Fig. 3. The stationary part of casing 10 has a chamber 10h formed within an enlargement thereon at its upper side, said chamber having openings 10i at either side thereof at its inner or rear ends and said chamber 10h has disposed therein a pair of coiled compression springs 13 having their ends seating against the outer or front end of chamber 10h. A member 14, shown as a substantially rectangular yoke or link formed of a small rod or wire, has one end extending through chamber 10h and through openings 10i in position to engage the inner ends of springs 13. The other end of yoke 14 has pivoted thereon a lever 15 having a short camlike end 15a at one side of its pivot and a handle portion 15b at the other or outer side of its pivot. Movable part 10g has means thereon in the form of a projection 10j of hooklike form, said projection thus forming a concave recess at its outer and lower side.

A member 16 is provided constituting a shell and said member has a central cylindrical portion 16a adapted to be disposed and fit within chamber 10d and said portion has an interior chamber with which communicate an inlet port 16b and an outlet port 16c. Member 16 has end members 16d and while these might be connected to portion 16a in various ways, in the embodiment of the invention illustrated, they are shown as having hub portions 16f threaded into the ends of portion 16a with fine threads. As clearly shown in Figs. 2 and 4, members 16d have flanges which engage the ends of casing portion 10c, being of substantially the same diameter as said portion. Members 16d have slots formed in their outer sides extending substantially diametrically thereof and the ends of flat bars 17 are disposed in said slots being secured to members 16d by the screws 18, said bars 17 having their outer surfaces flush with the ends of members 16d. Bars 17 converge above member 16, said ends being brought into engagement and secured in a handle member 19 shown as having a ferrule 20 secured to its lower end. The ends of bars 17 are threaded at the outer end of handle 19 and a nut 21 is secured thereon engaging the outer end of handle 19. The flanges of members 16d have shoulders 16e formed thereon and these are adapted to engage when the valve is in discharging position with pins 22 projecting from the ends of portion 10c of casing 10. When the valve is in closed position, members 17 engage the top of sleeve portion 10a. A small central slot 10k is formed in the outer end of the stationary part of casing 10.

In operation, cream or other liquid to be dispensed is contained in the container 11 and flows through sleeve 10a. When the valve is in receiving position as illustrated in full lines in Fig. 2, the liquid flows through the port 10e and port 16b which is now alined therewith into the interior of member 16 or into the chamber in member 16. It will be seen that at this time outlet port 16c is out of alinement with discharge port 10f. The chamber in member 16, therefore, fills with liquid. When the liquid is to be discharged, the operator takes hold of handle 19 and swings the same outwardly to the position indicated in dotted lines in Fig. 3 or until the shoulders 16e engage with pins 22. Inlet port 16b moves out of alinement with port 10e thus closing communication between member 16 and sleeve 10a and discharge port 16c moves into alinement with discharge port 10f. Inlet port 16b has its edge moved sufficiently to partially aline with slot 10k. The liquid now flows out through ports 16c and 10f, air being allowed to enter the chamber in member 16 through the small slot 10k.

When the parts are to be disassembled, the handle 15b of lever 15 is swung upwardly and lever portion 15a then moves out of engagement with the under side of hook portion 10j. Yoke 14 can now be swung outwardly as indicated in the dotted line position in Fig. 3 and portion 10g can swing downwardly to the position indicated in dotted lines in Fig. 3. Member 16 can now be readily removed from chamber 10d. The parts can now be easily and readily cleaned.

When the valve is to be reassembled, member 16 is placed in chamber 10d and portion 10g is swung upwardly to engage and embrace portion 16a so that said portion is now embraced and held between the movable portion 10g and the stationary portion 10c of casing 10. Yoke 14 is now swung downwardly and moves over and embraces projection 10j. Lever 15 is now swung downwardly to the position shown in Fig. 3. End portion 15a engages the under side of projection 10j and yoke 14 is pulled downwardly against the tension of springs 13 and lever handle 15b moves past the dead center position of the end of yoke 14 and is held in the position shown in Fig. 3 with springs 13 under tension. It will be noted that the free end of portion 10g is spaced slightly from the outer end of the stationary portion 10c of the casing and portion 10g is held with resilient pressure in engagement with portion 16a. Portion 16a is thus snugly embraced under resilient pressure and should any wear occur between parts 10 and 16, portion 10g will be moved upwardly by springs 13 and portion 16a will continue to be snugly engaged with the proper fit and pressure. There is thus an automatic take-up for any wear which should occur.

From the above description it is seen that applicant has provided a very simple and efficient structure of measuring valve. The device can be quickly disassembled without removal of screws or other holding parts. The parts are so constructed that they can be easily and effectively cleaned. The device is maintained at all times in operative condition and as above stated, any wear which occurs on the moving parts is automatically taken up. The device in practice is suitably plated and polished so as to be quite handsome in appearance. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing having a movable part partially embracing said cylindrical member and spaced from the remainder of said casing at one point to permit movement thereof towards the remainder of said casing for snugly embracing said cylindrical member and taking up wear on said casing and member and readily movable to position to permit removal of said cylindrical plane and a resilient means for holding said movable part in position snugly engaging said cylindrical member and taking up the wear on said casing.

2. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing having a part hinged thereto and swingable away from said member and having its free end spaced from the remainder of said casing, permitting movement of said part toward said remainder of said casing to snugly engage said cylindrical member and take up wear on said parts and resilient means for holding said swingable part in position snugly engaging said cylindrical member and for automatically taking up said wear.

3. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing being divided substantially on a diametral plane of said chamber to have a movable part whereby said cylindrical member may be removed, said part being spaced from the remainder of said casing at one side of said plane of division whereby it can be moved toward the remainder of said casing to snugly embrace said cylindrical member and take up wear on said parts and means for holding said movable part in position to snugly engage said cylindrical manner.

4. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing being divided substantially on a diametral plane of said chamber to have a movable part movable to position whereby said cylindrical member may be removed, said part being movable toward the remainder of said casing to snugly embrace said cylindrical member and resilient means for holding said movable part in position to snugly engage said cylindrical member.

5. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing having a stationary part and having a movable part partially embracing said cylindrical member and spaced from the remainder of said casing at one point, a swinging member hinged to one part of said casing, resilient means engaging said swinging member and a lever pivoted on said swinging member, said other part of said casing having means engageable by said lever whereby said lever may be swung past a dead center position and place said resilient means under tension to hold said movable part in position snugly embracing said cylindrical member said resilient means acting automatically to take up wear on said casing.

6. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing having a stationary part and having a movable part partially embracing said cylindrical member and spaced from the remainder of said casing at one point, a yoke hinged to the fixed part of said casing, a spring engaged by one end of said yoke, a lever pivoted to the free end of said yoke, said fixed part of said casing having means embraced by said yoke and said movable part of said casing being engageable by one end of said lever whereby said lever may be swung past the dead center position to compress said spring and hold said movable part in position snugly embracing said cylindrical member whereby said spring will automatically move said parts of said casing together to take up wear.

7. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing having a stationary part and having a movable part partially embracing said cylindrical member and spaced from said stationary part at one point, a swingable locking means hinged to one part of said casing, a spring engaged by said means, said other part of said casing having means engageable by said locking means whereby said locking means may be operated to move said movable part toward said stationary part and snugly embrace said cylindrical member against the resistence of said spring.

8. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing having a stationary part and a swingable part divided substantially on a diametrical plane of said first mentioned chamber, one of said parts having a chamber adjacent the outer side thereof, resilient means in said chamber, a swinging member pivoted thereto engaging said resilient means and a lever pivoted to said swinging member and the other of said parts having means thereon engageable by said lever whereby said lever can be swung to hold said swingable part in position with said casing snugly embracing said cylindrical member under tension of said resilient means.

9. A measuring valve for liquids comprising a casing having a chamber thereon with a cylindrical wall and having receiving and discharge ports opening into said chamber, a cylindrical member oscillatably mounted in said chamber and having a chamber therein with inlet and outlet ports alineable respectively with said receiving and discharge ports, said casing having a stationary part and a movable part hinged thereto and swingable away from said member and having its free end spaced from said stationary part, permitting movement of said movable part toward said remainder of said casing to snugly engage said cylindrical member and take up wear on said casing and cylindrical member and swinging means on one of said parts engaging a means on the other of said parts for resiliently holding said movable member in position snugly engaging said cylindrical member.

10. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing having a stationary part and a swingable part movable away from said stationary part to permit removal of said cylindrical member and a swinging spring-pressed means carried by one of said parts and engaging the other part to hold said swingable part in position snugly embracing said cylindrical member and automatically take up wear between the parts of said casing and said cylindrical member.

11. A measuring valve for liquids comprising a casing having a chamber with a cylindrical wall therein and having receiving and discharge ports opening into said chamber, a cylindrical member oscillatably mounted in said chamber and having a chamber therein with inlet and outlet ports alineable respectively with said receiving and discharge ports, said casing having a stationary part and a swingable part divided substantially on a diametrical plane of said first mentioned chamber and a readily releasable resilient locking means for holding said swingable part in position snugly embracing said cylindrical member and acting automatically to take up wear between the parts of said casing and said cylindrical member.

ALBERT SLATEN.